United States Patent
Liu et al.

(10) Patent No.: US 10,951,346 B2
(45) Date of Patent: Mar. 16, 2021

(54) DECODING METHOD, APPARATUS, AND SYSTEM FOR OVXDM SYSTEM

(71) Applicant: Shenzhen Super Data Link Technology Ltd., Guangdong (CN)

(72) Inventors: Ruopeng Liu, Guangdong (CN); Chunlin Ji, Guangdong (CN); Xingan Xu, Guangdong (CN); Shasha Zhang, Guangdong (CN)

(73) Assignee: SHEN ZHEN KUANG-CHI HEZHONG TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 16/362,485

(22) Filed: Mar. 22, 2019

(65) Prior Publication Data

US 2019/0222347 A1 Jul. 18, 2019

Related U.S. Application Data

(63) Continuation of application No. PCT/CN2017/103308, filed on Sep. 26, 2017.

(30) Foreign Application Priority Data

Sep. 30, 2016 (CN) .......................... 201610875145.5

(51) Int. Cl.
*H04L 7/00* (2006.01)
*H04J 99/00* (2009.01)
*H04L 1/00* (2006.01)

(52) U.S. Cl.
CPC ............... *H04J 15/00* (2013.01); *H04L 1/00* (2013.01); *H04L 7/0079* (2013.01)

(58) Field of Classification Search
CPC .............................. H04J 15/00; H04L 7/0079
See application file for complete search history.

(56) References Cited

U.S. PATENT DOCUMENTS 6,563,812 B1 * 5/2003 De ...................... H04B 1/71052
370/286
2008/0273582 A1 * 11/2008 Gaal .................... H04L 25/0226
375/224

(Continued)

FOREIGN PATENT DOCUMENTS

CN          101431393 A       5/2009

OTHER PUBLICATIONS

English translation of International Search Report of PCT/CN2017/103308, dated Dec. 27, 2017., dated Dec. 27, 2017, 2 pages.

(Continued)

*Primary Examiner* — Jamal Javaid
(74) *Attorney, Agent, or Firm* — Cantor Colburn LLP

(57) ABSTRACT

This application discloses a decoding method for an OvXDM system, including: generating an augmented matrix B related to a received symbol information sequence; performing singular decomposition on the augmented matrix B; and performing decoding by using a total least square method, to obtain a decoded output information sequence. This application further discloses an OvXDM system. In a specific implementation of this application, decoding is performed by using the total least square method.

12 Claims, 3 Drawing Sheets

(56) References Cited

U.S. PATENT DOCUMENTS

2009/0180576 A1* 7/2009 Rulla ................. H04L 25/0212
375/320
2011/0103236 A1 5/2011 Li

OTHER PUBLICATIONS

European Search Report for corresponding application EP17854819; Report dated Apr. 20, 2020.
Xia Zhang, "The Analysis of Coded Overlapped Time Division Multiplexing System", Proceedings of IC-BNMT2010, IEEE 2010.
Xilin Zhang, "An ISI Transmission and the Optimal Detection/Decoding of the Coded ISI System", Porceedings of IWSDA, 2007.

* cited by examiner

DECODING METHOD, APPARATUS, AND SYSTEM FOR OVXDM SYSTEM

CROSS-REFERENCE TO RELATED APPLICATIONS

This application is a continuation application of PCT/CN2017/103308, filed Sep. 26, 2017, published as WO 2018/059369, which claims the priority of Chinese Application No. 201610875145.5, filed Sep. 30, 2016. The contents of the above-identified applications are incorporated herein by reference in their entireties.

TECHNICAL FIELD

The present invention relates to a decoding method, apparatus, and system for an OvXDM system.

BACKGROUND

In conventional decoding in an OvXDM (Overlapped X Division Multiplexing, overlapped X division multiplexing) system (where X represents any domain and may be time T, space S, frequency F, hybrid H, or the like), for example, Viterbi decoding, a node in a trellis diagram needs to be accessed constantly, and two storages are provided for each node, where one storage is used to store a Euclidean distance of a relatively optimal path to the node, and one storage is used to store the relatively optimal path to the node. For an M-dimensionally modulated system with K times of overlapping, the number of nodes in the trellis diagram is $M^K$. In a decoding process, each node needs to be expanded. Therefore, the quantity of nodes determines the decoding complexity, and the decoding complexity increases exponentially as the quantity of times of overlapping increases. It is well known that in the OvXDM system, spectral efficiency increases as the number K of times of overlapping increases. Therefore, a higher number K of times of overlapping is preferred. However, in a conventional decoding algorithm, for example, Viterbi decoding, when the number of times of overlapping reaches a specific value ($K>^8$), the decoding complexity increases drastically, and a prior-art decoding method cannot meet the real-time decoding requirements.

SUMMARY

The application provides a decoding method and apparatus for an OvXDM system, and an OvXDM system.

According to a first aspect of this application, this application provides a decoding method for an OvXDM system, including:

generating an augmented matrix B related to a received symbol information sequence;

performing singular decomposition on the augmented matrix B; and performing decoding by using a total least square method, to obtain a decoded output information sequence.

According to a second aspect of this application, this application provides a decoding apparatus for an OvXDM system, including:

a processing module, configured to generate an augmented matrix B related to a received symbol information sequence;

a decomposition module, configured to perform singular decomposition on the augmented matrix B; and a decoding module, configured to perform decoding by using a total least square method, to obtain a decoded output information sequence.

According to a third aspect of this application, this application provides an OvXDM system, including the foregoing decoding apparatus.

This application uses the foregoing technical solutions, and therefore, has the following beneficial effects:

In a specific implementation of this application, decoding is performed by using the total least square method. This resolves the problem in a conventional decoding method, for example, Viterbi decoding, that a large number of storage resources (path storages and distance storages) are needed, the decoding complexity increases drastically as the number of times of overlapping increases, and real-time performance of decoding output is relatively low because symbol-by-symbol decoding is performed in a decoding process. In this application, a decoding result can be obtained more accurately when a signal encounters noise interference.

This simplifies the decoding process, saves system resources, reduces the decoding complexity, and ensures system performance while improving the decoding efficiency.

DESCRIPTION OF EMBODIMENTS

The following further describes this application in detail by using specific implementations with reference to the accompanying drawings.

According to a total least square method, it is considered that interference exists in a regression matrix. This factor is considered when a least square solution is calculated.

It is assumed that $A_0$ and $b_0$ respectively represent an unmeasurable error-free data matrix and error-free data vector. An actually measured data matrix and data vector are respectively $A=A_0+E$ and $b=b_0+e$, where E and e respectively represent an error data matrix and an error data vector. A basic idea of the total least square method is that: An updating vector $\Delta b$ is used to cause interference on the data vector b, and also an updating vector $\Delta A$ is used to cause interference on the data vector A, so as to perform joint compensation for an error or noise existing between A and b.

$$b+\Delta b = b_0 + e + \Delta b \rightarrow b_0$$

$$A+\Delta A = A_0 + E + \Delta A \rightarrow A_0$$

This suppresses the impact of a measurement error or noise on solving a matrix equation, thereby converting errored matrix equation solving into accurate matrix equation solving: $(A+\Delta A)x = b+\Delta b \Rightarrow A_0 x = b_0$. Naturally, it is expected that an updating data matrix and an updating data vector are as small as possible. Therefore, a total least square method problem can be described as follows by using a constraint optimization problem:

$$TLS: \min_{\Delta A, \Delta b, x} \|[\Delta A, \Delta b]\|_2^2 = \|\Delta A\|_2^2 + \|\Delta b\|_2^2.$$

Therefore, the original matrix equation can be adapted to $$([A, b] + [\Delta A, \Delta b])\begin{bmatrix} x \\ -1 \end{bmatrix} = 0$$

or equivalent to $(B+D)z=0$. An augmented data matrix $B=[A, b]$ and an augmented updating matrix $D=[\Delta A, \Delta b]$ are both $m\times(n+1)$-dimensional matrix, and $$z = \begin{bmatrix} x \\ -1 \end{bmatrix}$$

is an $(n+1)\times 1$ vector.

It is assumed that a singular value of the $m\times(n+1)$-dimensional augmented matrix B is decomposed into $B=U\Sigma V^H$, where U is an $m\times m$-dimensional unitary matrix, $\Sigma$ is a $m\times(n+1)$-dimensional diagonal matrix, and V is a $(n+1)\times(n+1)$-dimensional unitary matrix. A total least square solution thereof is:

$$x_{TLS} = \frac{-1}{v(n+1, n+1)}\begin{bmatrix} v(1, n+1) \\ \vdots \\ v(n, n+1) \end{bmatrix},$$

where $v(i, n+1)$ is the $i^{th}$ element of the $(N+1)^{th}$ column of V.

Figure 1:
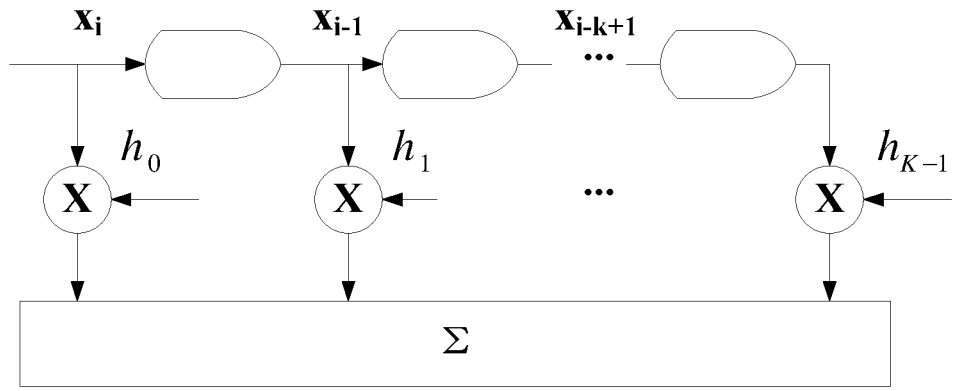
FIG. 1 is an equivalent convolutional encoding model of OvXDM.

An OvXDM system (where X represents any domain, and may be time T, space S, frequency F, hybrid H, or the like) is actually an equivalent convolutional encoding system, and an encoding model thereof is shown in FIG. 1. A convolutional operation is performed on an input symbol sequence x according to this model and a multiplexed waveform h, to obtain a transmitted symbol sequence y, thereby implementing mutual shifted overlapping between symbols. A formula used in a shifted convolution process may be represented as $$y = \sum_{i=0}^{N-1} x_i h(t - i \times \Delta T).$$

N represents a data frame length, K represents a number of times of shifted overlapping, and a data length after overlapping and encoding is $N+K-1$.

If the foregoing formula is expanded, each transmitted symbol after overlapping may be represented as:

$$y_0 = x_0 \times h_0,$$
$$y_1 = x_0 \times h_1 + x_1 \times h_0,$$
$$y_2 = x_0 \times h_2 + x_1 \times h_1 + x_2 \times h_0,$$
$$\dots$$
$$y_{K-1} = x_0 \times h_{K-1} + x_1 \times h_{K-2} + \dots + x_{K-1} \times h_0,$$
$$\dots$$
$$y_{N-1} = x_{N-K} \times h_{K-1} + x_{N-K+1} \times h_{K-2} + \dots + x_{N-1} \times h_0,$$
$$\dots$$
$$y_{N+K-3} = x_{N-2} \times h_{K-1} + x_{N-1} \times h_{k-2}, \text{ and}$$
$$y_{N+K-2} = x_{N-1} \times h_{K-1}$$

The series of formulas above may be represented using a matrix:

$$\begin{bmatrix} y_0 \\ y_1 \\ \dots \\ y_{K-1} \\ \dots \\ y_{N-1} \\ \dots \\ y_{N+K-2} \end{bmatrix} = \begin{bmatrix} h_0 & 0 & 0 & 0 & 0 & \dots & 0 \\ h_1 & h_0 & 0 & 0 & 0 & \dots & 0 \\ & & \dots & & & & \\ h_{K-1} & h_{K-2} & \dots & h_0 & 0 & \dots & 0 \\ & h_{K-1} & h_{K-2} & \dots & h_0 & \dots & 0 \\ & & & \dots & & & \\ 0 & \dots & 0 & h_{K-1} & h_{K-2} & \dots & h_0 \\ 0 & \dots & 0 & 0 & h_{K-1} & \dots & h_1 \\ & & & \dots & & & \\ 0 & \dots & 0 & 0 & 0 & 0 & h_{K-1} \end{bmatrix} \times \begin{bmatrix} x_0 \\ x_1 \\ x_2 \\ \dots \\ x_{K-1} \\ \dots \\ x_{N-1} \end{bmatrix}.$$

That is, a received symbol sequence matrix is represented as $$Y = \begin{bmatrix} y_0 \\ y_1 \\ \dots \\ y_{K-1} \\ \dots \\ y_{N-1} \\ \dots \\ y_{N+K-2} \end{bmatrix},$$

and a size is $(N+K-1)\times 1$.

A transmitted symbol sequence matrix is represented as $$X = \begin{bmatrix} x_0 \\ x_1 \\ x_2 \\ \dots \\ x_{K-1} \\ \dots \\ x_{N-1} \end{bmatrix},$$

and a size is $N\times 1$.

A multiplexed waveform coefficient matrix is represented as $$H = \begin{bmatrix} h_0 & 0 & 0 & 0 & 0 & \cdots & 0 \\ h_1 & h_0 & 0 & 0 & 0 & \cdots & 0 \\ & & \cdots & & & & \\ h_{K-1} & h_{K-2} & \cdots & h_0 & 0 & \cdots & 0 \\ & h_{K-1} & h_{K-2} & \cdots & h_0 & \cdots & 0 \\ & & \cdots & & & & \\ 0 & \cdots & 0 & h_{K-1} & h_{K-2} & \cdots & h_0 \\ 0 & \cdots & 0 & 0 & h_{K-1} & \cdots & h_1 \\ & & \cdots & & & & \\ 0 & \cdots & 0 & 0 & 0 & 0 & h_{K-1} \end{bmatrix},$$

and a size is $(N+K-1) \times N$.

A convolutional encoding process of the OvXDM system may be represented equivalently in a form of matrix as $Y = H \times X$.

In an actual receive end of an OvXDM system, because a signal is transmitted through a channel, there is interference on a received signal. This interference is considered in the total least square method; therefore, the total least square method is applicable to a decoding process of the OvXDM system.

Embodiment 1

Figure 2:
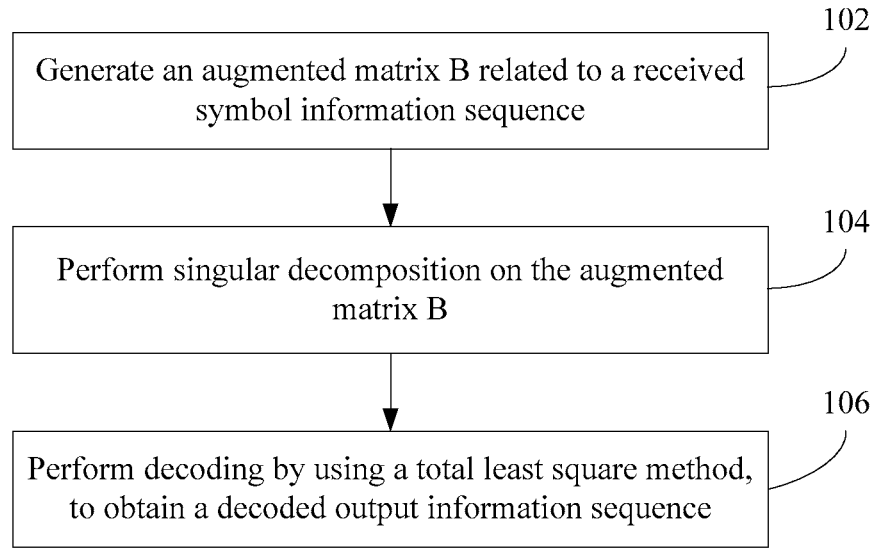
FIG. 2 is a flowchart of an implementation of a method according to this application.

As shown in FIG. 2, in an implementation, a decoding method for an OvXDM system according to this application includes the following steps:

Step 102. Generate an augmented matrix B related to a received symbol information sequence.

The augmented matrix is B=[H,y], where H is a multiplexed waveform coefficient matrix, y is the received symbol information sequence, a size of the matrix B is $(N+K-1) \times (N+1)$, N is a data frame length, and K is a number of times of overlapped multiplexing.

Step 104. Perform singular decomposition on the augmented matrix B.

Performing singular decomposition on the augmented matrix B includes: decomposing the augmented matrix B into $B = U\Sigma V^H$, where U is a unitary matrix of $(N+K-1) \times (N+K-1)$, $\Sigma$ is a diagonal matrix of $(N+K-1) \times (N+1)$, and V is a unitary matrix of $(N+1) \times (N+1)$.

Step 106. Perform decoding by using a total least square method, to obtain a decoded output information sequence.

Performing solving by using the total least square method specifically includes: decoding a received symbol sequence by using a formula $$x_{TLS} = \frac{-1}{v(N+1, N+1)} \begin{bmatrix} v(1, N+1) \\ \vdots \\ v(N, N+1) \end{bmatrix},$$

where $v(i, N+1)$ is the $i^{th}$ element of the $(N+1)^{th}$ column of V.

In the OvXDM system according to this application, X includes a time T domain, a space S domain, a frequency F domain, or a hybrid H domain.

Figure 3:
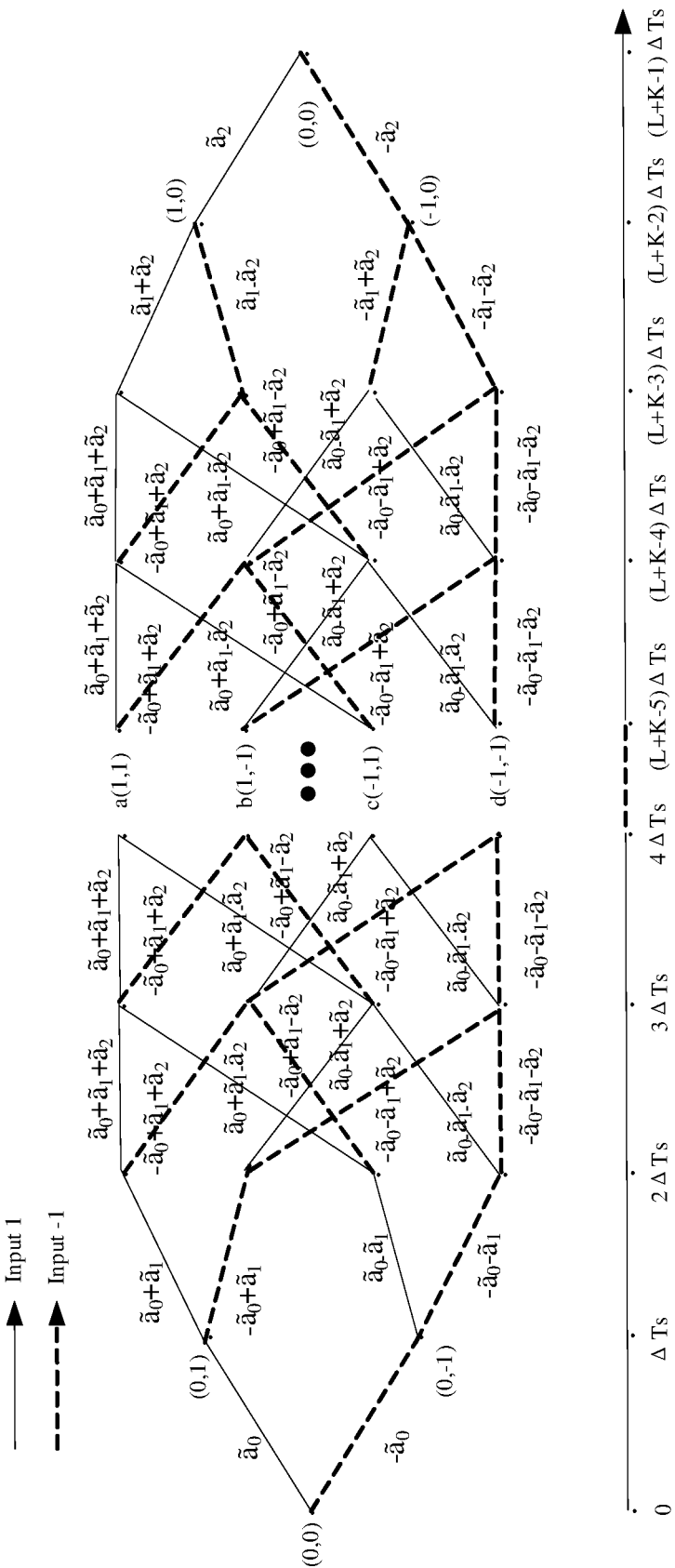
FIG. 3 is a trellis diagram of OvTDM.

The following describes in detail the decoding method of this application by using an overlapped time division multiplexing OvTDM system as an example:

It is assumed that the number of times of overlapped multiplexing is K=3. FIG. 3 is a trellis diagram of an OvTDM system when K=3. An input symbol sequence is $x=\{-1,-1,-1,+1,+1,-1,-1,+1,-1,-1\}$, and a length thereof is N=10. A rectangular wave h=[1,1,1] is a multiplexed waveform, and a sequence obtained after OvTDM encoding is $y=\{-1,-2,-3,-1,+1,+1,-1,-1,-1,-1,-2,-1\}$. A transmit end transmits an encoded signal through a channel. Because of channel noise interface, a signal that has undergone synchronization, channel estimation, and equalization and that is received by a receive end is:

$y'=\{-1.124,-1.799,-3.145,-1.173,1.182,1.030,-0.927,-0.951,-1.157,-0.8340,-1.823,-1.168\}$.

The signal is decoded by using the total least square method. Specific steps are as follows:

(1) Generate an augmented matrix B.

$B=[H,(y')^T]$, where the H matrix is an $(N+K-1) \times N$-dimensional matrix, that is, a 12*10 two-dimensional matrix; $(\bullet)^T$ represents a transpose operation on a matrix; $(y')^T$ is an $(N+K-1) \times 1$-dimensional matrix, that is, a 12*1 two dimensional matrix; and the augmented matrix B is an $(N+K-1) \times (N+1)$-dimensional matrix, that is, a 12*11 two-dimensional matrix.

(2) Perform singular decomposition on the augmented matrix B.

Singular decomposition is performed on the augmented matrix B to obtain $B=U\Sigma V^H$, where U is a unitary matrix of is a diagonal matrix of $(N+K-1) \times (N+K-1)$, $\Sigma$ is a diagonal matrix of $(N+K-1) \times (N+1)$, and V is a unitary matrix of $(N+1) \times (N+1)$.

(3) Perform solving by using the total least square method.

A received symbol sequence is decoded according to a formula $$x_{TLS} = \frac{-1}{v(N+1, N+1)} \begin{bmatrix} v(1, N+1) \\ \vdots \\ v(N, N+1) \end{bmatrix},$$

where $v(i, N+1)$ is the $i^{th}$ element of the $(N+1)^{th}$ column of V.

A result obtained through decoding is decoder=$\{-1,-1,-1,+1,+1,-1,-1,+1,-1,-1,\}$. It can be learned through comparison with the input symbol sequence that the result is correct.

During decoding by using the total least square method, the algorithm complexity is slightly affected by the number of times of overlapped multiplexing, and is mainly related to a data frame length N.

In an implementation, the following step is further included before step 102:

Step 100: Perform synchronization processing and channel equalization on the received signal sequence.

In the OvTDM system according to this application, a processing process at the receive end is as follows:

A transmit end transmits an encoded and modulated signal through an antenna, and the signal is transmitted in a radio channel. The receive end performs matched filtering on the received signal; then separately performs sampling and decoding on the signal; and finally performs determining and outputs a bit stream.

Step 100 may specifically include the following steps:

(1) First synchronize received signals, including carrier synchronization, frame synchronization, symbol time synchronization, and so on.

(2) Perform digitalization processing on a received signal in each frame according to a sampling theorem.

(3) Segment a received waveform based on a waveform transmission time interval.

Embodiment 2

Figure 4:
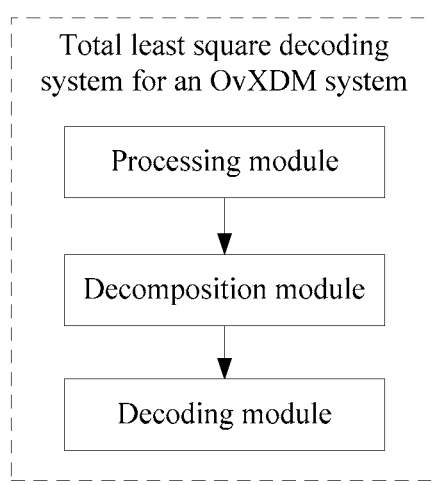
FIG. 4 is a schematic diagram of functional modules in an embodiment of a system according to this application.

FIG. 4 shows a decoding apparatus for an OvXDM system according to this application, where X includes a time T domain, a space S domain, a frequency F domain, or a hybrid H domain. In an implementation, the decoding apparatus includes a processing module, a decomposition module, and a decoding module. The processing module is configured generate an augmented matrix B related to a received symbol information sequence. The decomposition module is configured to perform singular decomposition on the augmented matrix B. The decoding module is configured to perform decoding by using a total least square method, to obtain a decoded output information sequence.

In an implementation, the augmented matrix is B=[H, y], where H is a multiplexed waveform coefficient matrix, y is the received symbol information sequence, a size of the matrix B is (N+K−1)×(N+1), N is a data frame length, and K is a number of times of overlapped multiplexing.

The decomposition module according to this application is further configured to decompose the augmented matrix B into B=UΣV$^H$, where U is a unitary matrix of (N+K−1)×(N+K−1), Σ is a diagonal matrix of (N+K−1)×(N+1), and V is a unitary matrix of (N+1)×(N+1).

In an implementation, the decoding module is further configured to decode received symbol information by using a formula $$x_{TLS} = \frac{-1}{v(N+1, N+1)} \begin{bmatrix} v(1, N+1) \\ \vdots \\ v(N, N+1) \end{bmatrix},$$

where v(i, N+1) is the i$^{th}$ element of the (N+1)$^{th}$ column of V.

The decoding apparatus for an OvXDM system according to this application may further include a preprocessing module, where the preprocessing module is configured to perform synchronization processing and channel equalization on the received signal sequence. In a specific implementation, the preprocessing module may be specifically configured to synchronize received signals, including carrier synchronization, frame synchronization, symbol time synchronization, and so on; perform digitalization processing on a received signal in each frame according to a sampling theorem; and segment a received waveform based on a waveform transmission time interval.

Embodiment 3

An OvXDM system according to this application includes the decoding apparatus for an OvXDM system in Embodiment 2.

In an implementation, the OvXDM system may include an OvTDM (Overlapped Time Division Multiplexing, overlapped time division multiplexing) system, an OvFDM (Overlapped Frequency Division Multiplexing, overlapped frequency division multiplexing) system, an OvCDM (Overlapped Code Division Multiplexing, overlapped code division multiplexing) system, an OvSDM (Overlapped Space Division Multiplexing, overlapped space division multiplexing) system, or an OvHDM (Overlapped Hybrid Division Multiplexing, overlapped hybrid division multiplexing) system.

The foregoing contents are further detailed descriptions of this application in combination with specific implementation, and it cannot be construed that specific implementations of this application is only restricted to these descriptions. Persons with ordinary skills in the art may still make several simple deductions or replacements without departing from the concepts of this application.

The invention claimed is:

1. A decoding method for an Overlapped X Division Multiplexing (OvXDM) system, comprising:
   receiving, at a receive end of the OvXDM system, a signal which is sent by a transmit end of the OvXDM system through an antenna and transmitted in a radio channel, wherein the signal comprises a received symbol information sequence;
   generating, at the receive end, an augmented matrix B related to the received symbol information sequence, wherein the augmented matrix is B=[H, y], wherein H is a multiplexed waveform coefficient matrix, y is the received symbol information sequence, a size of the matrix B is (N+K−1)×(N+1), N is a data frame length, and K is a number of times of overlapped multiplexing;
   performing, at the receive end, singular decomposition on the augmented matrix B;
   performing, at the receive end, decoding by using a total least square method based on the singular decomposition of the augmented matrix B, to obtain a decoded output information sequence; and
   outputting, at the receive end, the decoded output information sequence.

2. The decoding method for an OvXDM system according to claim 1, wherein the performing singular decomposition on the augmented matrix B comprises: decomposing the augmented matrix B into B=UΣV$^H$, wherein U is a unitary matrix of (N+K−1)×(N+K−1), Σ is a diagonal matrix of (N+K−1)×(N+K−1), and V is a unitary matrix of (N+1)×(N+1).

3. The decoding method for an OvXDM system according to claim 2, wherein the performing decoding by using a total least square method based on the singular decomposition of the augmented matrix B specifically comprises: decoding the received symbol sequence by using a formula $$x_{TLS} = \frac{-1}{v(N+1, N+1)} \begin{bmatrix} v(1, N+1) \\ \vdots \\ v(N, N+1) \end{bmatrix},$$

wherein v(i, N+1) is the i$^{th}$ element of the (N+1)$^{th}$ column of V.

4. The decoding method for an OvXDM system according to claim 1, wherein before the generating an augmented matrix B related to a received symbol information sequence, the method further comprises: performing synchronization processing and channel equalization on a received signal sequence.

5. The decoding method for an OvXDM system according to claim 2, wherein before the generating an augmented matrix B related to a received symbol information sequence, the method further comprises: performing synchronization processing and channel equalization on a received signal sequence.

6. The decoding method for an OvXDM system according to claim 3, wherein before the generating an augmented matrix B related to a received symbol information sequence, the method further comprises: performing synchronization processing and channel equalization on a received signal sequence.

7. A decoding apparatus for an Overlapped X Division Multiplexing (OvXDM) system, wherein the decoding apparatus is provided at a receive end of the OvXDM system and comprises a hardware processor and a memory, wherein the hardware processor is configured to execute the following program modules stored in the memory:
  a receiving module, configured to receive a signal which is sent by a transmit end of the OvXDM system through an antenna and transmitted in a radio channel, wherein the signal comprises a received symbol information sequence;
  a processing module, configured to generate an augmented matrix B related to the received symbol information sequence, wherein the augmented matrix is B=[H, y], wherein H is a multiplexed waveform coefficient matrix, y is the received symbol information sequence, a size of the matrix B is (N+K−1)×(N+1), N is a data frame length, and K is a number of times of overlapped multiplexing;
  a decomposition module, configured to perform singular decomposition on the augmented matrix B;
  a decoding module, configured to perform decoding by using a total least square method based on the singular decomposition of the augmented matrix B, to obtain a decoded output information sequence; and
  an outputting module, configured to output the decoded output information sequence.

8. The decoding apparatus for an OvXDM system according to claim 7, wherein the hardware processor is configured to further execute the following program module stored in the memory:
  a preprocessing module, configured to perform synchronization processing and channel equalization on a received signal sequence.

9. The decoding apparatus for an OvXDM system according to claim 7, wherein
  the decomposition module is further configured to decompose the augmented matrix B into B=UΣV$^H$, wherein U is a unitary matrix of (N+K−1)×(N+K−1), Σ is a diagonal matrix of (N+K−1)×(N+K−1), and V is a unitary matrix of (N+1)×(N+1).

10. The decoding apparatus for an OvXDM system according to claim 9, wherein the decoding module is further configured to decode the received symbol sequence by using a formula $$x_{TLS} = \frac{-1}{v(N+1, N+1)} \begin{bmatrix} v(1, N+1) \\ \vdots \\ v(N, N+1) \end{bmatrix},$$

wherein v(i, N+1) is the i$^{th}$ element of the (N+1)$^{th}$ column of V.

11. An Overlapped X Division Multiplexing (OvXDM) system, comprising a decoding apparatus for an OvXDM system provided at a receive end of the OvXDM system, wherein
  the decoding apparatus for the OvXDM system comprises a hardware processor and a memory, wherein the hardware processor is configured to execute the following program modules stored in the memory:
  a receiving module, configured to receive a signal which is sent by a transmit end of the OvXDM system through an antenna and transmitted in a radio channel, wherein the signal comprises a received symbol information sequence;
  a processing module, configured to generate an augmented matrix B related to a the received symbol information sequence, wherein the augmented matrix is B=[H, y], wherein H is a multiplexed waveform coefficient matrix, y is the received symbol information sequence, a size of the matrix B is (N+K−1)×(N+1), N is a data frame length, and K is a number of times of overlapped multiplexing;
  a decomposition module, configured to perform singular decomposition on the augmented matrix B;
  a decoding module, configured to perform decoding by using a total least square method based on the singular decomposition of the augmented matrix B, to obtain a decoded output information sequence; and
  an outputting module, configured to output the decoded output information sequence,
  wherein the OvXDM system comprises an OvTDM system, an OvFDM system, an OvCDM system, an OvSDM system, or an OvHDM system.

12. The OvXDM system as claimed in claim 11, wherein the hardware processor in the decoding apparatus for the OvXDM system is configured to further execute the following program module stored in the memory:
  a preprocessing module, configured to perform synchronization processing and channel equalization on a received signal sequence.

* * * * *